(12) United States Patent
Alcazar et al.

(10) Patent No.: US 7,395,534 B2
(45) Date of Patent: Jul. 1, 2008

(54) SYSTEM AND METHOD FOR PROGRESSIVELY INSTALLING A SOFTWARE APPLICATION

(75) Inventors: Mark A. Alcazar, Seattle, WA (US);
Michael Dunn, Redmond, WA (US);
Adriaan W. Canter, Seattle, WA (US);
Venkata Rama Prasad Tammana, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 883 days.

(21) Appl. No.: 10/444,699

(22) Filed: May 22, 2003

(65) Prior Publication Data

US 2004/0237083 A1 Nov. 25, 2004

(51) Int. Cl.
*G06F 9/445* (2006.01)
(52) U.S. Cl. .................. 717/174; 717/175; 717/176; 717/177; 717/178
(58) Field of Classification Search .......... 717/168–178
See application file for complete search history.

(56) References Cited

U.S. PATENT DOCUMENTS

| | | | |
|---|---|---|---|
| 5,388,211 A | | 2/1995 | Hornbuckle |
| 5,835,777 A | | 11/1998 | Staelin |
| 5,960,204 A | * | 9/1999 | Yinger et al. ............... 717/176 |
| 5,995,756 A | | 11/1999 | Herrmann |
| 6,157,948 A | * | 12/2000 | Inoue et al. ................. 709/219 |
| 6,226,747 B1 | | 5/2001 | Larsson et al. |
| 6,272,556 B1 | | 8/2001 | Gish |
| 6,282,711 B1 | | 8/2001 | Halpern et al. |
| 6,289,512 B1 | | 9/2001 | Edwards et al. |
| 6,347,398 B1 | * | 2/2002 | Parthasarathy et al. ...... 717/178 |
| 6,381,742 B2 | | 4/2002 | Forbes et al. |
| 6,496,979 B1 | | 12/2002 | Chen et al. |
| 6,546,554 B1 | | 4/2003 | Schmidt et al. |
| 6,574,618 B2 | * | 6/2003 | Eylon et al. .................... 707/1 |
| 6,654,888 B1 | * | 11/2003 | Cooper et al. ............... 717/174 |
| 6,698,018 B1 | | 2/2004 | Zimniewicz et al. |
| 6,715,144 B2 | | 3/2004 | Daynes et al. |
| 6,918,113 B2 | | 7/2005 | Patel et al. |
| 6,931,546 B1 | | 8/2005 | Kouznetsov et al. |
| 6,959,320 B2 | * | 10/2005 | Shah et al. .................. 717/174 |
| 7,028,296 B2 | | 4/2006 | Irfan et al. |
| 7,062,567 B2 | | 6/2006 | Benitez et al. |
| 7,069,293 B2 | | 6/2006 | Cox et al. |
| 7,111,055 B2 | | 9/2006 | Falkner |

(Continued)

FOREIGN PATENT DOCUMENTS

WO    WO2005045562    5/2005

*Primary Examiner*—William Wood
(74) *Attorney, Agent, or Firm*—Lee & Hayes, PLLC

(57) ABSTRACT

Described is a mechanism for enabling an application operating as a web application to transition to a client-side application without impacting a user's interaction with the application. The progressive installation transitions through three states: a start-up state, a demand state, and an install state. During the start-up state, a subset of components associated with the application is downloaded and stored in a local data store. The subset is sufficient to allow execution of the application in a manner similar to a web application. During the demand state, additional resources associated with the application are downloaded. Transitioning from the demand state to the installed state occurs without impacting a user's interaction with the application. The transition may occur autonomously based on the number of additional resources stored in the local data store or upon an external trigger.

25 Claims, 10 Drawing Sheets

U.S. PATENT DOCUMENTS

| | | |
|---|---|---|
| 2002/0032763 A1* | 3/2002 | Cox et al. .................. 709/223 |
| 2002/0104015 A1 | 8/2002 | Barzilai et al. |
| 2002/0188941 A1 | 12/2002 | Cicciarelli et al. |
| 2003/0084439 A1 | 5/2003 | Perkins et al. |
| 2003/0145316 A1 | 7/2003 | McKinlay et al. |
| 2003/0204843 A1 | 10/2003 | Barmettler et al. |
| 2003/0212990 A1 | 11/2003 | Brodkorb et al. |
| 2004/0003390 A1 | 1/2004 | Canter et al. |

* cited by examiner

SYSTEM AND METHOD FOR PROGRESSIVELY INSTALLING A SOFTWARE APPLICATION

BACKGROUND OF THE INVENTION

There are two main types of applications available today. A first type of application is a client-side application. The client-side application resides on a client computer and is available for use whenever the client computer is operational. This client-side application undergoes a distinct installation state before it is available for use. Typically, the installation state displays some form of a progress user-interface, such as a thermometer, during installation. During the installation state, the client-side application is not available for use. The client-side application must be fully installed before a user can use the application.

The other type of application is commonly referred to as a Web application or Web app. The Web app is stored on a Web server. The Web app is commonly deployed as multiple Web pages accessible over the Internet. A conventional Web app includes multiple Web pages representing markup-based documents. The Web app may also include scripts or other resources that are accessed through the Web pages. For most Web apps, the multiple Web pages and resources are hyperlinked together in such a way that the "business logic" of the Web app is distributed over the multiple resources. Each page is responsible for a portion of the overall business logic, and, by navigating from page to page, the user can experience the entire Web app. For the purpose of this document, the term "navigating" refers to causing a hosting environment to retrieve a resource associated with the Web app, such as by activating a hyperlink. Navigating to a resource typically involves navigating away from another resource where the navigated-to resource is the one being retrieved by the hosting environment. Web apps do not require an installation phase and are not available once the client computer is disconnected from the Web server.

Both of these methods for interacting with a software application have advantages and disadvantages, neither one is ideal.

SUMMARY OF THE INVENTION

The present invention provides a system and method for progressively installing a software application so that a user may begin interacting with the application immediately. Then, while interacting with the application, the application may be progressively installed on the user's computer, and if desired, become available offline at a later time. The progressive installation includes three states: a startup state, a demand state, and a final state. None of the states require a dedicated installation phase in which the application is unavailable for use. Instead, the progressive installation of the present invention blends the two forms of application installation in a manner such that the Web app may be interacted with as a conventional Web app, and then smoothly transitioned to a client-side application without impacting the user's interaction with the application.

The invention provides a mechanism for progressively installing an application. The progressive installation transitions through three states: a start-up state, a demand state, and an install state. During the start-up state, a subset of components associated with the application is downloaded and stored in a local data store. The subset is sufficient to allow execution of the application in a manner similar to a web application. During the demand state, additional resource associated with the application are downloaded upon activation of a hyperlink on a Web page associated with the application. The additional resources that are on demand resources are stored in the local data store. The additional resources that are online resources are stored in a transient cache. During the installed state, the application executes in a manner similar to a client-side application. Transitioning from the demand state to the installed state occurs without impacting a user's interaction with the application. The transition may occur autonomously based on the number of additional resources stored in the local data store or upon an external trigger. During the transition, additional resources that have not been previously downloaded are downloaded to the local data store. In addition, state derived during the demand state is saved with the application, which allows the application to resume from the same state when executed offline.

DETAILED DESCRIPTION OF THE PREFERRED EMBODIMENT

Briefly, the present invention provides a system and method for progressively installing a software application so that a user may begin interacting with the application immediately. Then, while interacting with the application, the application may be progressively installed on the user's computer, and, if desired, installed in a manner such that the application is available offline at a later time. The progressive installation includes three states: a startup state, a demand state, and a final state. None of the states require a dedicated installation phase in which the application is unavailable for use. Instead, the progressive installation of the present invention blends the two forms of application installation in a manner such that the Web app may be interacted with as a conventional Web app, and then provides a mechanism for smoothly transitioning the application to an offline application without impacting the user's interaction with the application.

Figure 1:
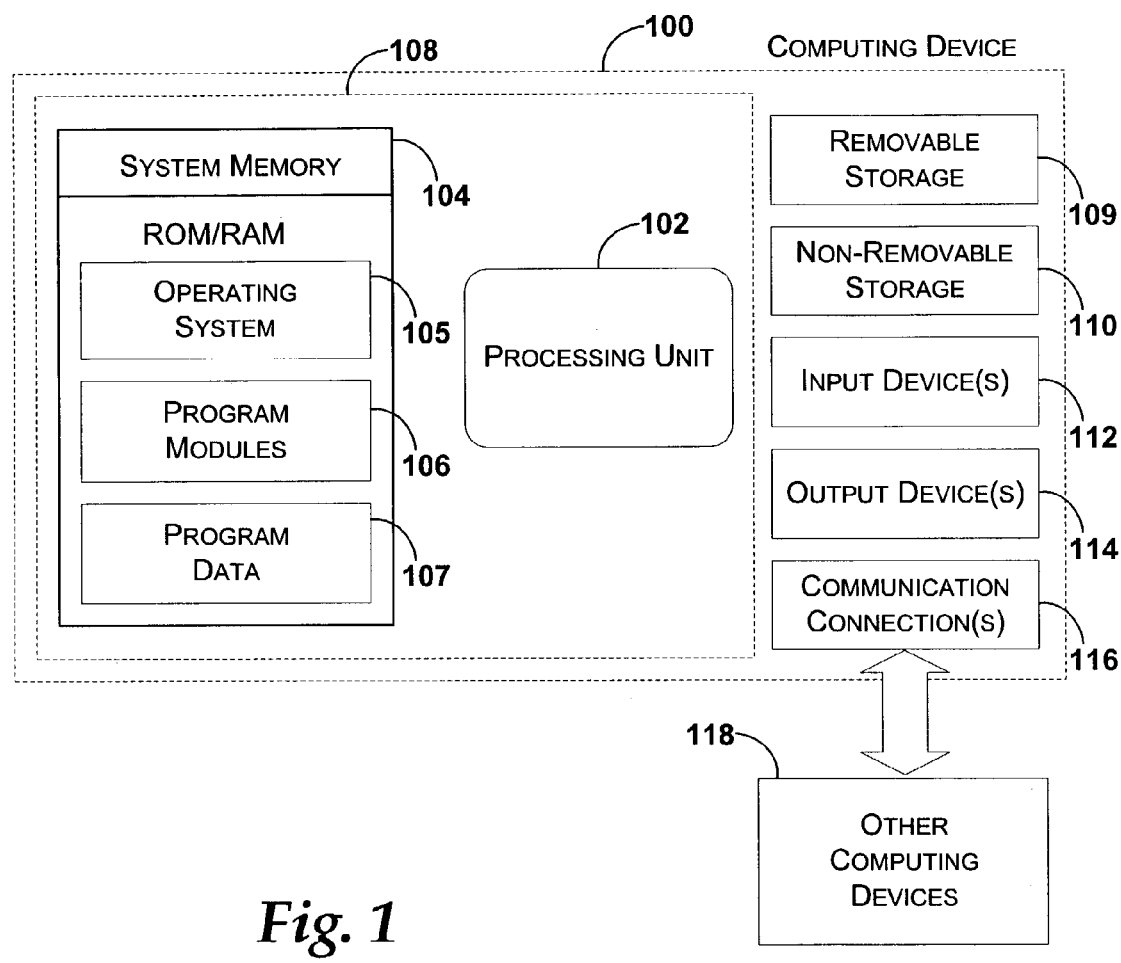
FIG. 1 illustrates an exemplary computing device that may be used in one exemplary embodiment of the present invention.

FIG. 1 illustrates an exemplary computing device that may be used in one exemplary embodiment of the present invention. FIG. 1 illustrates an exemplary computing device that may be used in one exemplary embodiment of the present invention. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

Computing device 100 may also contain communication connections 116 that allow the device to communicate with other computing devices 118, such as over a network. Communication connections 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
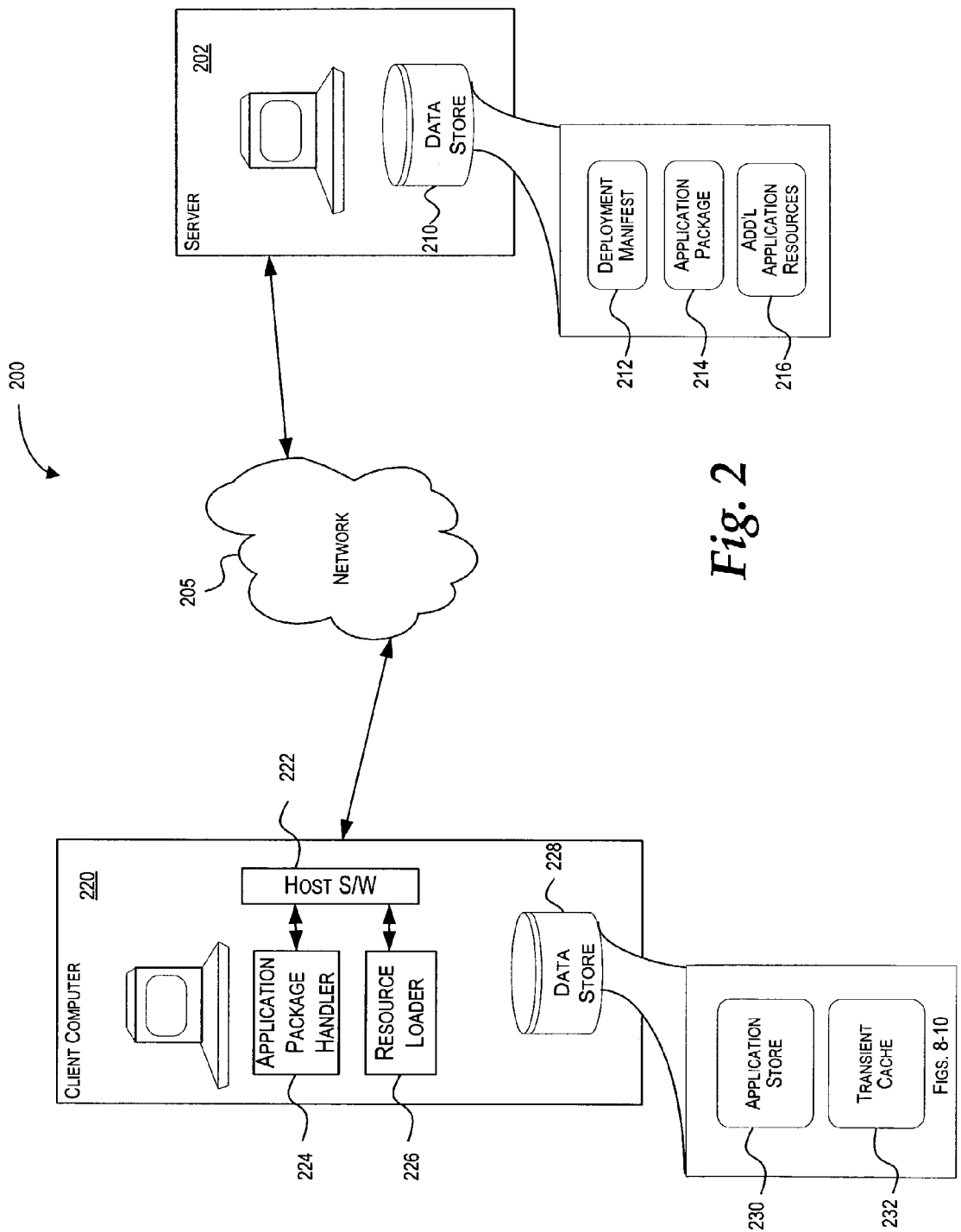
FIG. 2 is a functional block diagram overview of a distributed networking environment in which implementations of the invention may be embodied.

FIG. 2 is a functional block diagram overview of a distributed networking environment in which implementations of the invention may be embodied. As illustrated in FIG. 2, two or more computers, such as a server 202 and a client computer 220, are connected over a network 205. Server 202 and client computer 220 are computing devices such as the one described above in conjunction with FIG. 1. The computers may be connected in a corporate environment, where the network 205 may be a local area network or a wide area network. Similarly, the computers may be arbitrarily connected over a wide area network, such as the Internet.

The server 202 is a computing device that is configured to make resources available to other computing devices connected to the network 205. The server 202 may include Web serving software to serve Internet related resources, such as HyperText Markup Language (HTML) documents and the like. The server 202 includes local storage in the form of a server data store 210. On the server data store 210 are at least some of the resources made available by the server 202 over the network 205. In particular, a deployment manifest 212 is stored on the server data store 210, as well as an application package 214 and additional application resources 216, which are described in detail later in conjunction with FIGS. 8-10. The server 202 also includes other applications for constructing and maintaining the deployment manifest 212, as well as other related documents and resources. In this implementation, the server 202 makes the application package 214 and the additional application resources 216 available over the network 205 to other computing devices.

The client computer 220 is a computing device configured to execute locally-running applications as well as connect to other computers over the network 205. The client computer 220 also includes local storage in the form of a client data store 228. On the client data store 228 resides an application store 230 and a transient cache 232. In one embodiment, each application executing on client computer 220 has an associated application store 230. The client computer 220 also includes other applications for interacting with other computers over the network. One such application is host software 222, such as Internet browsing software (hereinafter referred to as browser 222). The browser 222 communicates with an application package handler 224 and a resource loader 226. The application package handler 224 is registered so that when the browser 222 encounters an application package, such as application package 214, the browser knows to call the application package handler 224. The application package handler 224 then processes the application package 214. The application package 214 contains the minimal amount of information to start execution of the associated application on the client computer 220. The format for the application package 214 may be an executable or other packaging type format. In one embodiment, the application package handler 224 may be configured to decipher the format of the application package in order to obtain the relevant information. The browser 222 also communicates with the resource loader 226 when the client computer requests additional resources from the server 202, such as additional application resources 216. The processing performed by browser 222, application package handler 224, and resource loader 226 will be described in greater detail below in conjunction with flow diagrams FIGS. 5-7.

Briefly stated, a user of the client computer 220 may connect to the server 202 in any conventional manner. The server 202 presents a Web page or some other resource that makes available files that reside on the server data store 210. In response to a selection of a link or the like by the user, the server 202 navigates to the deployment manifest 212, which identifies the application package 214 associated with the requested application. As will be described in greater detail below, the application package 214 contains the minimum amount of code necessary to start the application. The application package 214 is brought down to the client computer 220 from the server 202.

Figure 3:
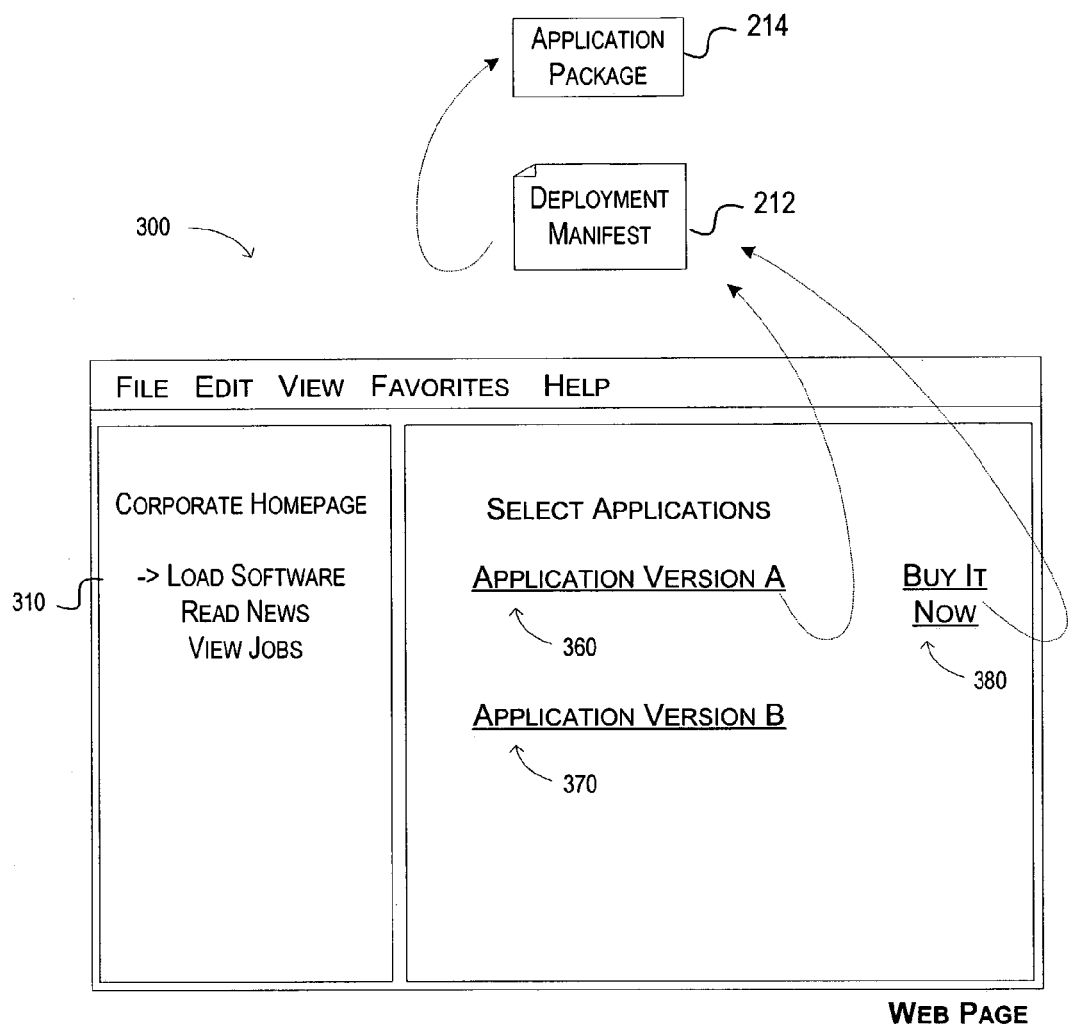
FIG. 3 is an illustrative screen display that may be presented by Web browsing software for enabling the progressive download of an application, in accordance with one implementation of the invention.

FIG. 3 is an illustrative screen display that may be presented by Web browsing software enabling the progressive download of a remote application, in accordance with one implementation of the invention. Turning briefly to FIG. 3, an example display 300 of the browser 222 is shown including a Web page 310 that may be served by the server 202 described above. The Web page 310 may be a resource associated with a particular Web app or may be a resource for making available software applications to remote computing systems for download. The Web page 310 includes a hyperlink 360 pointing to the deployment manifest 212 described above. The deployment manifest 212 points to the application package 214, which contains at least the minimum code necessary to start the application. The Web page 310 also includes a hyperlink 380 pointing to the deployment manifest 212 described above. The selection of hyperlink 380 indicates that the user is now interested in explicitly "installing" the application. As will be described in detail below in conjunction with FIG. 7, upon selecting hyperlink 380, the user may continue to interact with the application without waiting for the application to download or become installed on the computer.

It will be appreciated that the Web page 310 may be provided over the Internet, a corporate intranet, or any other network-accessible location. Activating the hyperlink 360 causes the application package 214 to be pulled down from the server. It should be appreciated that the Web page 310 is only one way that the user may invoke the application. For instance, a link to the application package 214 may be provided in an e-mail message, or the like.

Figure 4:
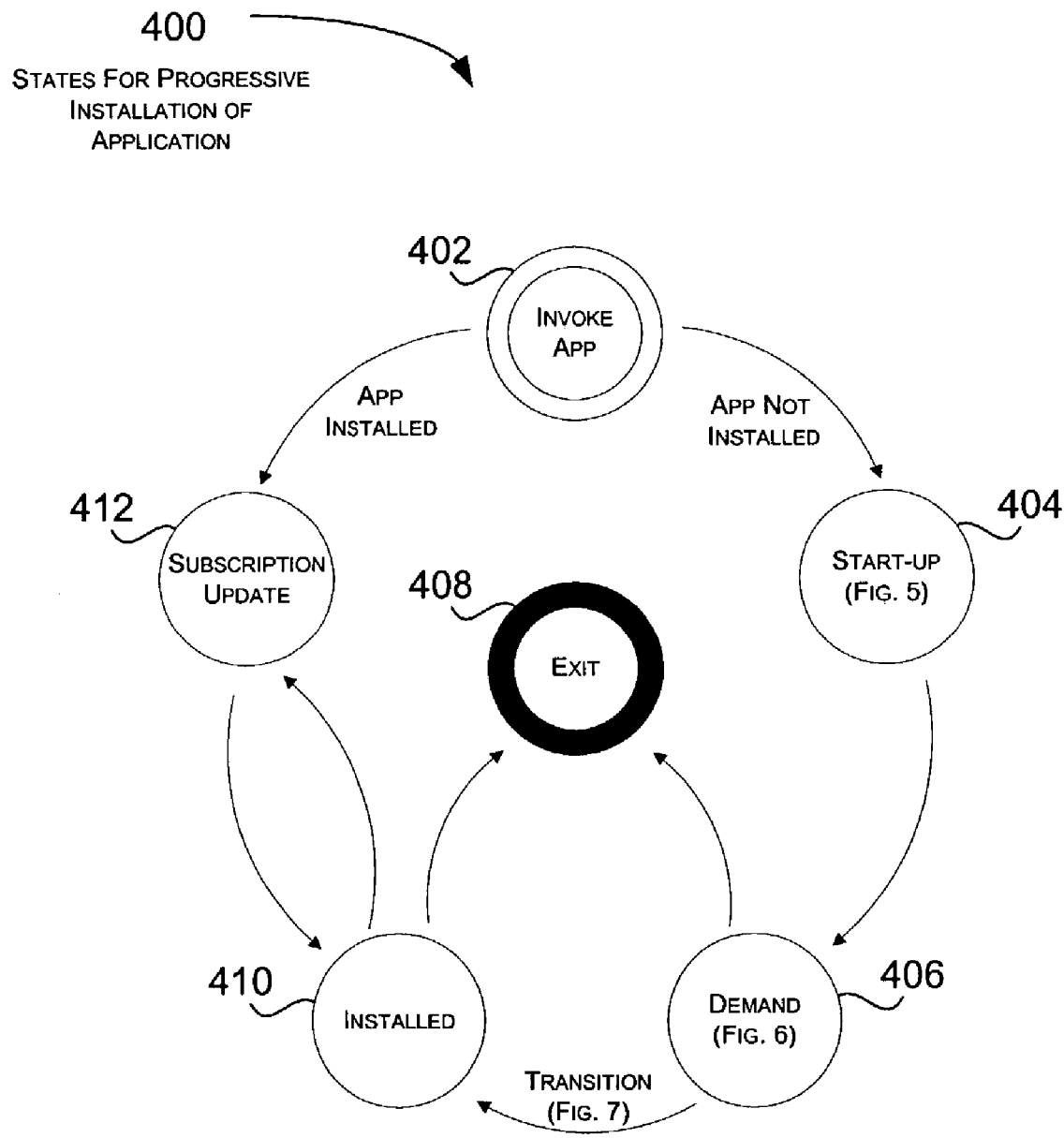
FIG. 4 is a state diagram illustrating various states of the progressive installation of an application, in accordance with one implementation of the invention.

FIG. 4 is a state diagram 400 illustrating various states of the progressive installation of an application, in accordance with one implementation of the invention. The progressive installation includes an invoke state 402, a start-up state 404, a demand state 406, and an installed state 410. At the invoke state 402, a user as invoked the application. If the user invokes the application by clicking a link that is served by server 202, the progressive installation proceeds to the start-up state 404. However, as will be described later in detail, the application may have become installed on the client computer already. The locally installed application may be invoked, such as by selecting a link to the local application, selecting a short-cut in the start menu to the local application, and the like. When the locally installed application is invoked, the process transitions to the installed state 410. In another embodiment, the transition to the installed state 410 from the invoke state 402 may proceed via a subscription update state 412. Briefly, the subscription update state 412 determines whether there is an update to the application available on the server 202. If there are any updates, the updated components of the application are downloaded.

Now, assuming that the application has not been installed locally, the progressive installation proceeds to the start-up state 404. Briefly, described in detail in conjunction with FIG. 5, the start-up state 404 downloads the minimum code necessary for the application to run on the client computer. Because, the minimum code is considerably less than the full application, the user can begin interacting with the application right away, similar to a user's experience when interacting with a traditional Web app today. From the start-up state, the progressive installation proceeds to the demand state 406. Briefly, described in detail in conjunction with FIG. 6, the demand state 406 downloads resources as needed. This allows the user to try the application before committing to purchasing the application or developing a lasting relationship with the application.

From the demand state 406, the user may proceed to the exit state 408, foregoing the installation of the application locally. This may occur when the user closes the browser. Once the user transitions from the demand state 406 to the exit state 408, the downloaded components of the application may be deleted. Therefore, the client computer is in the same state as before the user invoked the application. The user may then later invoke the remote application again. The progressive installation will proceed again through the startup state and demand state. Thus, the user may use the application again without committing to installing the application. From the demand state 406, the progressive installation may transition to the installed state 410. The transition may be user-initiated based on a purchasing decision, a request for elevated permission (e.g., trust elevation), or may be performed autonomous by the operating system, such as when a pre-determined number of resources have already been installed on the client computer. The transition from the demand state to the installed state does not impact the user's interaction with the application. This transition is described below in conjunction with FIG. 7.

Thus, the progressive installation in accordance with the present invention allows a user to begin interacting with an application as soon as it is invoked. Pieces of the application are downloaded as the user interacts without impacting the user. At no time, does the user need to wait for a dedicated installation.

Figure 5:
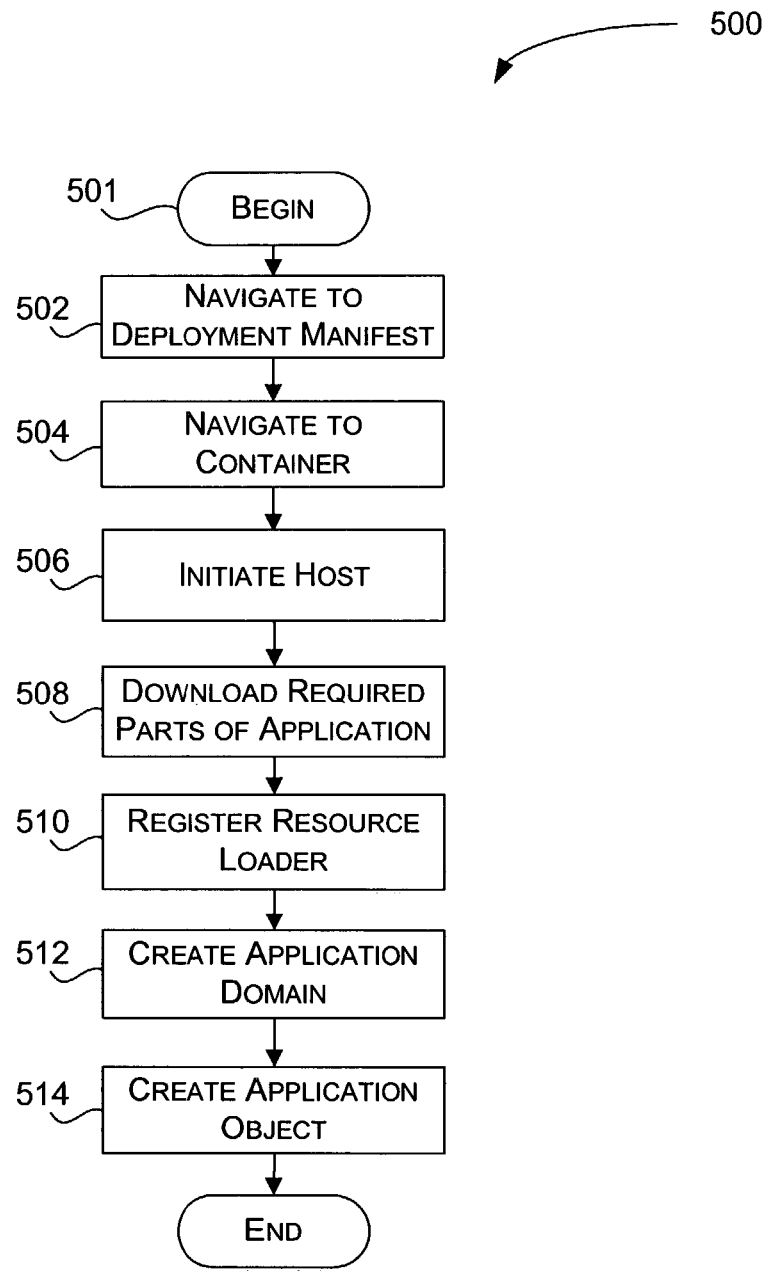
FIG. 5 is a logical flow diagram generally illustrating a process during a start-up state of the progressive installation.

FIG. 5 is a logical flow diagram generally illustrating a process during a start-up state of the progressive installation in accordance with one embodiment of the present invention. The process begins at block 501 where an application residing over a network as been invoked, such as by selecting a hyperlink related to the application. Before continuing with FIG. 5, the components of the application residing over the network are described in conjunction with FIG. 8.

Figure 8:
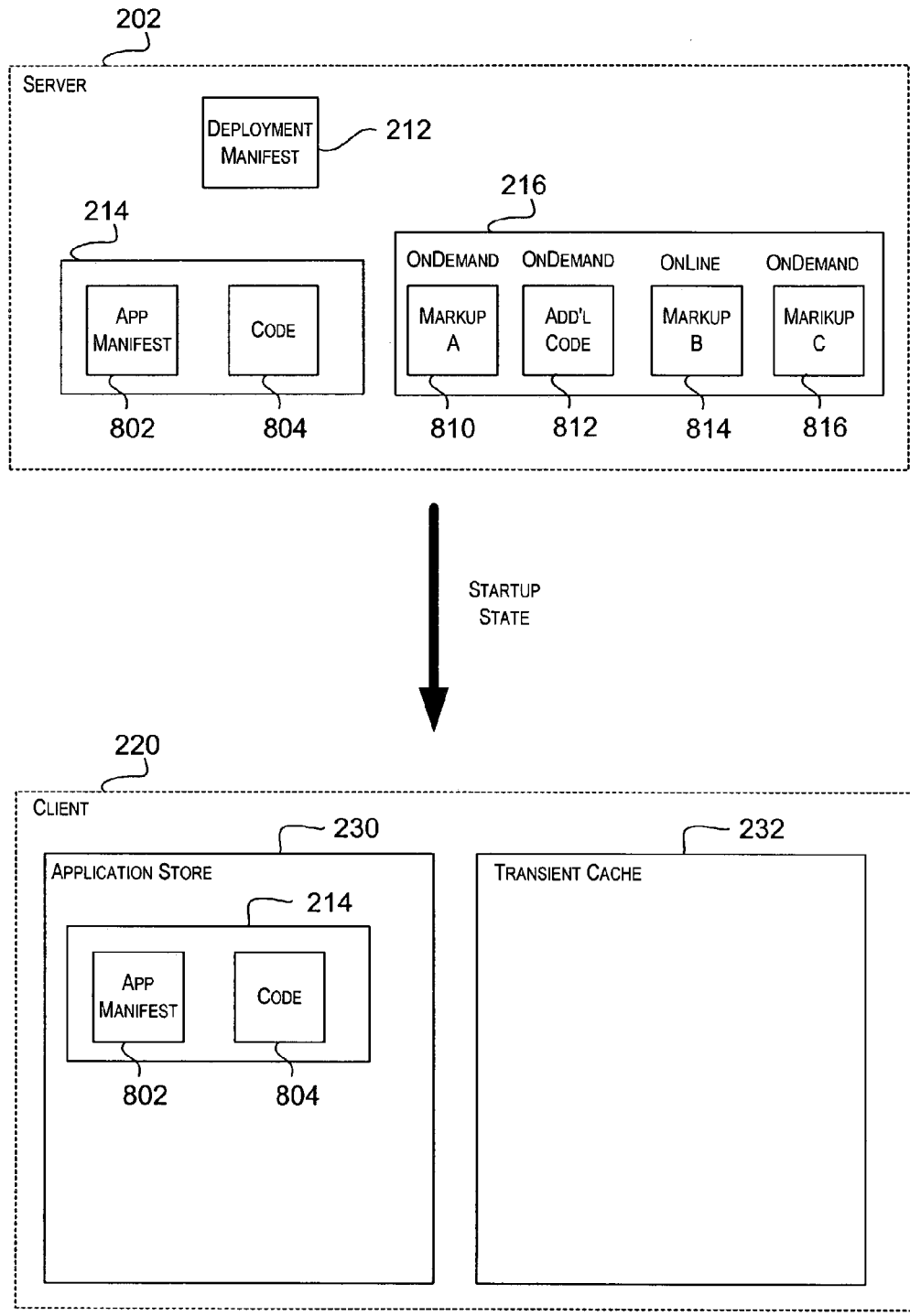
FIGS. 8-10 are a series of block diagrams graphically illustrating files that are loaded during the progressive installation, in accordance with one implementation of the invention.
Figure 9:
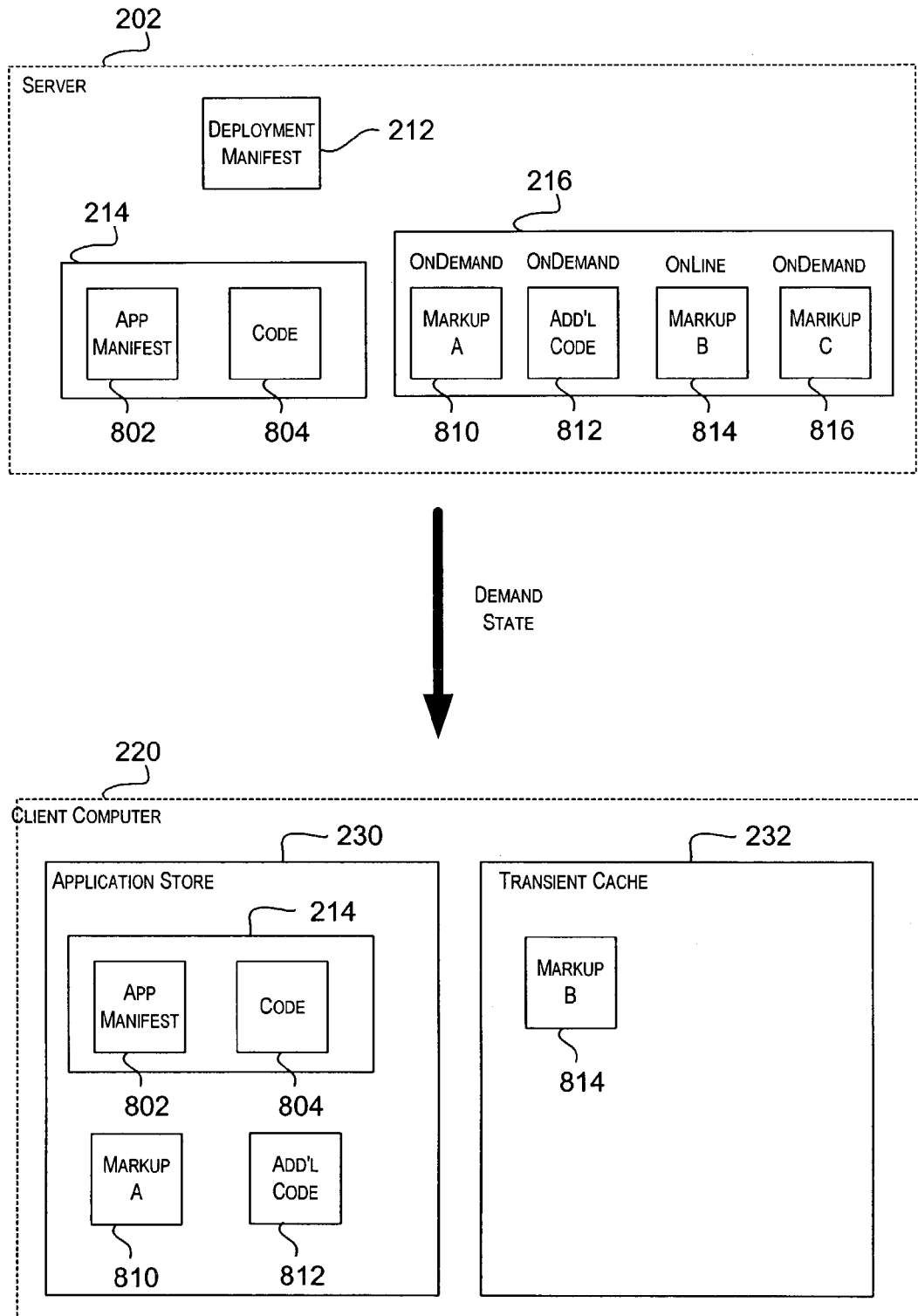

FIG. 8 is a graphical depiction of the components of the application residing over the network on server 202. The components include the deployment manifest 212, the application package 214, and additional application resources 216. The application package 214 includes an application manifest 802 and code 804. The application manifest 802 describes the application code in detail including each component, their versions and dependencies. A sample application manifest of such a nature is included with this document as "Appendix A—Sample Application Manifest." Although described in this document as a specific file, the application manifest 212 of the invention should be interpreted to mean information describing the components of the application in any form and it may exist in locations other than just those described here. The application manifest 212 described here is by way of illustration only. In one embodiment, the code 804 includes the minimal code necessary to run the application. As one skilled in the art will appreciate, additional, non-necessary code may be included within application package 214 without departing from the present invention. However, in order to have the less delay or impact to the user, the minimal amount of code is desired. The additional application resources 216 include on demand resources and online resources, such as markup A 810, additional code 812, markup B 814 and the like. While FIG. 8, illustrates only five additional resources, one skilled in the art will appreciate that, typically, there are several additional resources that are components of the Web app.

Returning to FIG. 5, at block 502, navigation to the deployment manifest 212 occurs in one embodiment of the present invention. In one embodiment, the deployment manifest resides on a remote server and identifies an entry point for the application.

At block 504, navigation to the entry point occurs. In one embodiment, the entry point may be an application package (e.g., application package 214 shown in FIG. 8) that includes an application manifest and the minimum amount of code necessary to run the application.

At block 506, the host is initiated. In one embodiment, the host is a web browser. In another embodiment, in which the application is being progressively installed from the client computer, the host may be a standalone host. The standalone host will then function in the same manner as described below using the embodiment in which the host is a web browser. The application package handler is registered for the file type associated with the application package. Therefore, when the browser receives the application package, the application package handler may initiate the progressive installation in accordance with the present invention. In one embodiment, the application package handler may be a mime handler that is registered for the file type associated with the application package 214.

At block 508, the minimum amount of code necessary to run the application is downloaded. For the embodiment using the application package 214, this includes downloading the application package 214. As mentioned above, the browser will call the application package handler to process the application package 214.

At block 510, the resource loader is registered and associated with the application. The resource loader is responsible for loading application resources as they are needed. In one embodiment, the resource loader may be a pluggable protocol that knows how to load resources "in the context" of an application.

At block 512, an application domain for the application is created. At block 514, the user code that constitutes the application is executed. In one embodiment, the execution of the application creates an application object. Code within the application package that defines a class is executed to create the application object. The application object has a unique identity. In addition, the application object includes a state. The state will be continuously updated during the demand state. The state includes information related to the user's interaction with the application. This state information will allow the application to smoothly transition from a web application to a client application.

Processing in the start-up state is complete. The progressive installation will then proceed to the demand state. As shown in FIG. 8, after the start-up is complete, the application package 214 is stored in the application store 230 on the client computer 220. The user may begin interacting with the application. For prior Web apps, resources of the web app were downloaded to the transient cache 232 without having the concept of a per application store 230. As will be shown, by having the per application store 230, the present invention may smoothly transition from a web app to a client-side application without impacting the user.

Figure 6:
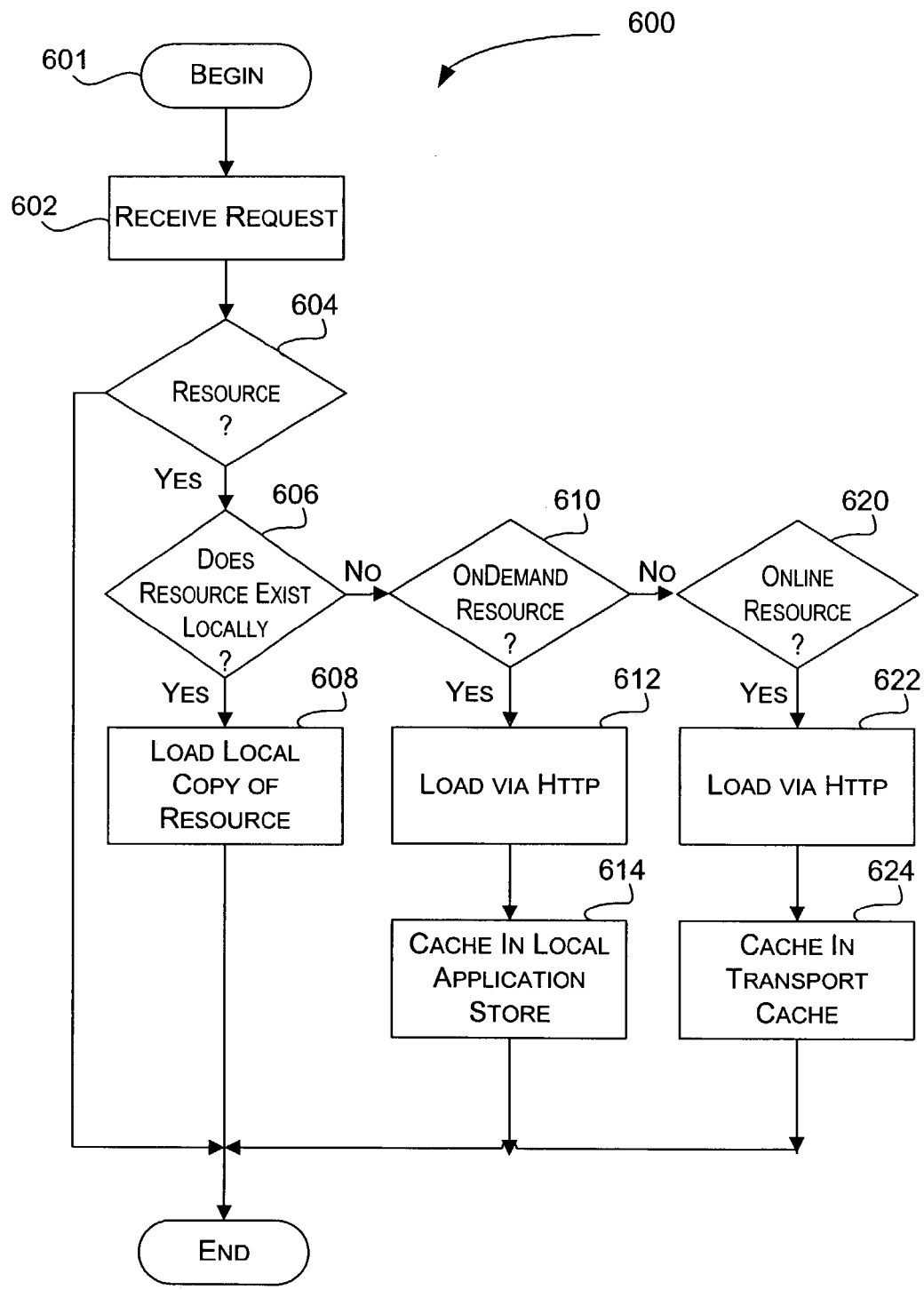
FIG. 6 is a logical flow diagram generally illustrating a process during a demand state of the progressive installation.

FIG. 6 is a logical flow diagram generally illustrating a process during a demand state of the progressive installation. The demand state begins at block 601 where the startup state is completed and the user is interacting with the application. Process 600 depicts processing that occurs whenever a part of the application is requested. This may includes requests for assembly loads (code), resources, and the like. Typically, many requests for resources and code will be received during the demand state. Each such request will perform process 600. The following discussion describes process 600 when the request is a resource. Those skilled in the art will appreciate that process 600 is also performed when the request is for an assembly load.

At block 602, a request is received. Typically, the request occurs whenever a user selects a hyperlink on one of the web pages associated with the application. Processing continues to decision block 604.

At decision block 604, a determination is made whether the request is for a resource. If the request is not for a resource, processing proceeds to the end. On the other hand, when the request is for a resource, processing continues to decision block 606.

At decision block 606, a determination is made whether the requested resource is available locally. If the resource is available locally, the local copy of the resource is loaded for use and the process proceeds to the end. Depending on the type of resource, the local copy may either be in the application store or in the transient cache. If the resource is not available locally, processing continues at decision block 610.

At decision block 610 a determination is made whether the requested resource is an on demand resource. If the requested resource is an on demand resource, the resource is loaded via http and cached in the local application store. For example, in FIG. 9, markup A 810 and code 812 are stored in the application store 230. The process proceeds to the end. At decision block 610, if the resource is not an on demand resource, processing continues to decision block 620.

At decision block 620, a determination is made whether the resource is an online resource. If the resource is an online resource, processing continues to block 622 where the online resource is loaded via http. At block 624, the online resource is cached in the transport cache 232. For example, in FIG. 9, markup b 814, which is designated as an online resource, is stored in the transient cache. Processing is then complete.

Thus, as one will note, during the demand state, additional resources are downloaded and are populated in the per application store. Because these resources that are download are the same resources that are needed to run the application offline, as will be described below, the application store, along with the application object, allow the present invention to smoothly transition from a web application to a client-side application without impacting the user's interaction with the application. Thus, instead of having two different types of application, (i.e., a client-side application and a web application), one type of application may be used for both purposes. Using the present invention, the one type of application smoothly transitions from one purpose to the other purpose when desired.

Figure 7:
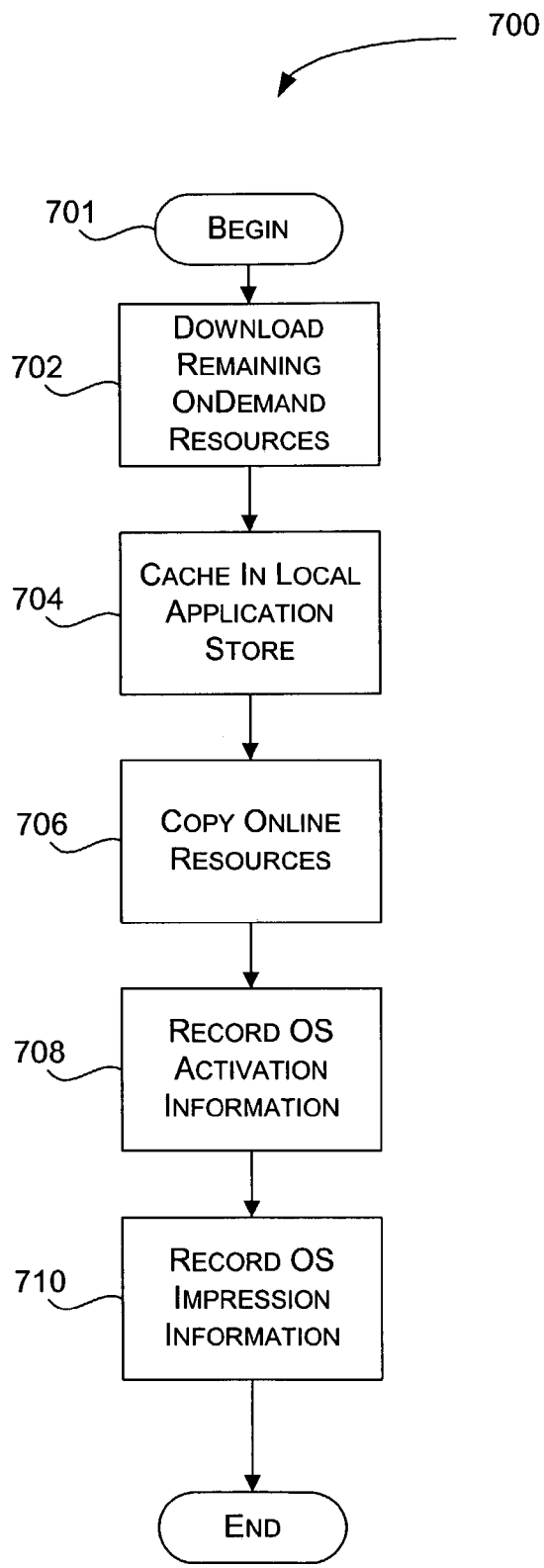
FIG. 7 is a logical flow diagram generally illustrating a process for transitioning between the demand state and an install state of the progressive installation.

FIG. 7 is a logical flow diagram generally illustrating a process for transitioning between the demand state and the install state of the progressive installation. Processing begins at block 701 where a trigger has occurred to signal that the application should be installed. The trigger may be user-initiated or may be autonomous based on an external benchmark, such as the number of resources that have already been downloaded into the per application store. Processing continues at block 702.

Figure 10:
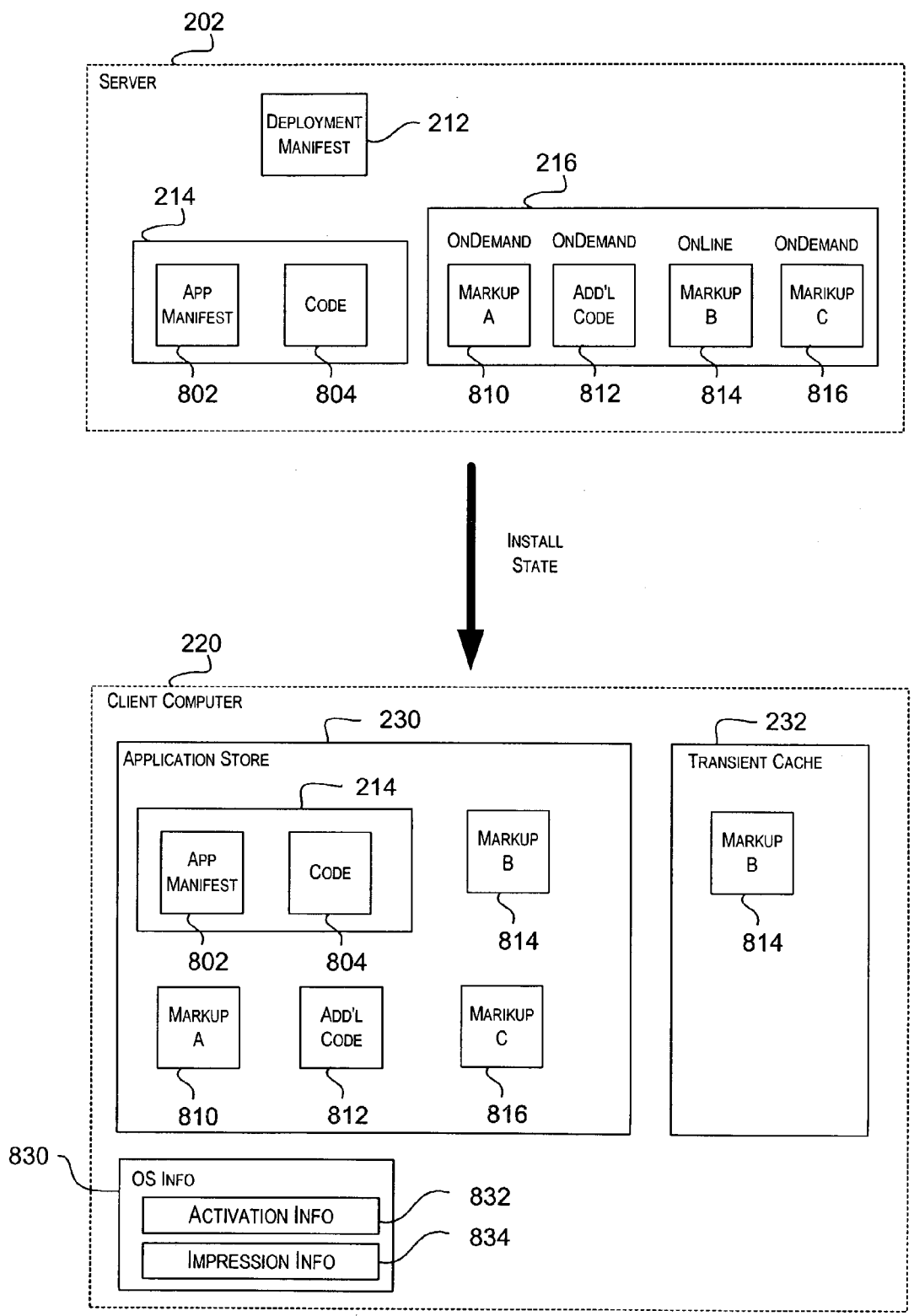

At block 702, the remaining on demand resources are downloaded via http. Processing continues at block 704. At block 704, these remaining on demand resources are stored in the application store. This occurs while the user is still interacting with the application. For example, FIG. 10 illustrates Markup C 816 now residing in the application store. Processing continues at block 706.

At block 706, a copy of online resources is stored in the application store 230. Therefore, if the copy in the transient cache is removed, a copy of the online resource still exists. For example, referring to FIG. 10, Markup B 814 is illustrated as being stored in the application store. Processing continues at block 708.

At block 708, activation information is recorded in the operating system. For example, a shortcut may be added to the start menu. The activation information allows the application to be invoked using traditional mechanisms the next time the application is invoked locally. Processing continues at block 710.

At block 710, impression information is recorded in the operating system. The impression information describes the manner in which the application interacts with the operating system, such as file associations. In addition, the impression information describes how the application may be changed/removed from the program entries. Referring to FIG. 10, activation information 832 and impression information 834 are shown within operating system information 830 on the client computer 220. Processing is then complete.

At mentioned above, at this point, the application is available offline. As one notes after reading the above description, the user did not have to wait for the installation of the application. Information generated during the demand state is transitioned to the installed state. Thus, through the use of the application identity and state information that was stored while the user was interacting with the application, the application may smoothly transition to the install state.

The above specification, examples and data provide a complete description of the manufacture and use of the composition of the invention. Since many embodiments of the invention can be made without departing from the spirit and scope of the invention, the invention resides in the claims hereinafter appended.

Appendix A. Sample Application Manifest

```
<?xml version="1.0" encoding="UTF-8" standalone="yes"?>
<assembly xmlns:asm_namespace_v1="urn:schemas-microsoft-com:asm.v1"
manifestVersion="1.0">
    <assemblyIdentity
        name="Microsoft.Fusion.ClickOnceTest.URT.MultiLevel"
        version="1.0.0.0"
        processorArchitecture="x86"
        type="application"
        language="*"
        publicKeyToken="144CC461D95B64FF"/>
    <description>
        Microsoft.Fusion.ClickOnceTest.URT.MultiLevel
    </description>
    <application>
        <shellState
            friendlyName="ClickOnceTest.URT.MultiLevel"
            showCommand="normal"
            hotKey="0"
            entryPoint=""
            entryImageType=".NetAssembly"/>
        <activation assemblyName="MultiLevel"/>
    </application>
    <file name="buildAll.cmd"
hash="C39911F3F35068013F1AB9ED8DC58469"/>
        <file name="L1_Asm1.cs"
hash="A24B49E13CE5A409D857BC05DC46B5F7"/>
        <file name="L1_Asm2.cs"
hash="2061EF44BD9ECE958EF5EBB9FC10C335"/>
        <file name="L1_Asm3.cs"
hash="461DC925229846952A4D0B81A8688D7B"/>
        <file name="L1_Asm4.cs"
hash="96DF5C47919BF7C4A3C04AA1FD3F274D"/>
        <file name="L2_Asm1_Dep1.cs"
hash="2DB9715F8369340F1D3D1F290A4FF8B1"/>
        <file name="L2_Asm1_Dep2.cs"
hash="142D1D046CE13F279F0B07714365D495"/>
        <file name="L2_Asm2_Dep1.cs"
hash="E002AA267654F32EC115C5A8F297CE58"/>
        <file name="L2_Asm3_Dep1.cs"
hash="1B09608FEF6D6065A221B8ACFB90CFA6"/>
        <file name="L2_Asm3_Dep2.cs"
hash="3A90FA6BF2E4755718FF1E8B35BB701D"/>
        <file name="L3_Asm3_Dep2_SubDep1.cs"
hash="64BDB1C8E105D7560CCFA942705B1DC5"/>
        <file name="MultiLevel.cs"
hash="4DAFA9788DBFCD281A1C3EE486B0809F"/>
        <file name="readme.txt"
hash="8726A66D3EDC6B36C9F41E1085A894E7"/>
        <file name="TopLevel.cs"
hash="B7F904FAC94B10AA864245E27D272F54"/>
    <dependency>
```

-continued

```
        <dependentAssembly>
            <assemblyIdentity name="L1_Asm1" version="1.2.3.4"
publicKeyToken="e8ed396099c4b4e9" processorArchitecture="x86"
language="x-ww"/>
            <install codebase="L1_Asm1.dll"/>
        </dependentAssembly>
        <dependentAssembly>
            <assemblyIdentity name="L1_Asm2" version="1.2.3.4"
publicKeyToken="e8ed396099c4b4e9" processorArchitecture="x86"
language="x-ww"/>
            <install codebase="L1_Asm2.dll"/>
        </dependentAssembly>
        <dependentAssembly>
            <assemblyIdentity name="L1_Asm3" version="1.2.3.4"
publicKeyToken="e8ed396099c4b4e9" processorArchitecture="x86"
language="x-ww"/>
            <install codebase="L1_Asm3.dll"/>
        </dependentAssembly>
        <dependentAssembly>
            <assemblyIdentity name="L1_Asm4" version="1.2.3.4"
publicKeyToken="e8ed396099c4b4e9" processorArchitecture="x86"
language="x-ww"/>
            <install codebase="L1_Asm4.dll"/>
        </dependentAssembly>
        <dependentAssembly>
            <assemblyIdentity name="L2_Asm1_Dep1"
version="1.2.3.4" publicKeyToken="e8ed396099c4b4e9"
processorArchitecture="x86" language="x-ww"/>
            <install codebase="L2_Asm1_Dep1.dll"/>
        </dependentAssembly>
        <dependentAssembly>
            <assemblyIdentity name="L2_Asm1_Dep2"
version="1.2.3.4" publicKeyToken="e8ed396099c4b4e9"
processorArchitecture="x86" language="x-ww"/>
            <install codebase="L2_Asm1_Dep2.dll"/>
        </dependentAssembly>
        <dependentAssembly>
            <assemblyIdentity name="L2_Asm2_Dep1"
version="1.2.3.4" publicKeyToken="e8ed396099c4b4e9"
processorArchitecture="x86" language="x-ww"/>
            <install codebase="L2_Asm2_Dep1.dll"/>
        </dependentAssembly>
        <dependentAssembly>
            <assemblyIdentity name="L2_Asm3_Dep1"
version="1.2.3.4" publicKeyToken="e8ed396099c4b4e9"
processorArchitecture="x86" language="x-ww"/>
            <install codebase="L2_Asm3_Dep1.dll"/>
        </dependentAssembly>
        <dependentAssembly>
            <assemblyIdentity name="L2_Asm3_Dep2"
version="1.2.3.4" publicKeyToken="e8ed396099c4b4e9"
processorArchitecture="x86" language="x-ww"/>
            <install codebase="L2_Asm3_Dep2.dll"/>
        </dependentAssembly>
        <dependentAssembly>
            <assemblyIdentity name="L3_Asm3_dep2_subDep1"
version="1.2.3.4" publicKeyToken="e8ed396099c4b4e9"
processorArchitecture="x86" language="x-ww"/>
            <install codebase="L3_Asm3_dep2_subDep1.dll"/>
        </dependentAssembly>
        <dependentAssembly>
            <assemblyIdentity name="MultiLevel"
version="0.0.0.0" processorArchitecture="x86" language="x-ww"/>
            <install codebase="MultiLevel.exe"/>
        </dependentAssembly>
        <dependentAssembly>
            <assemblyIdentity name="TopLevel" version="1.2.3.4"
publicKeyToken="e8ed396099c4b4e9" processorArchitecture="x86"
language="x-ww"/>
            <install codebase="TopLevel.dll"/>
        </dependentAssembly>
    </dependency>
</assembly>
```

We claim:

1. A computer-readable storage medium encoded with computer-executable instructions configured to perform a computer-implemented method, comprising:

Identifying an application package associated with an application, the application package including sufficient resources to enable user interaction with the application;

downloading content of the application package to a local store, the content being less than the full application;

upon receiving a request for one of a plurality of additional resources associated with the application, downloading the additional resource, the request for one of a plurality of additional resources being made without corresponding user action; and upon receiving a request to transition the application to a client-side full application, downloading remaining resources to the local store, the request to transition the application to a client-side full application being made without corresponding user action.

2. The computer-readable storage medium of claim 1, wherein identifying of the application package comprises activating a hyperlink associated with the application.

3. The computer-readable storage medium of claim 1, wherein identifying of the application package further comprises initiating retrieval of a deployment manifest that identifies the application package.

4. The computer-readable storage medium of claim 1, wherein a subset of components is identified by the application package.

5. The computer-readable storage medium of claim 1, wherein the application package comprises an application manifest and code.

6. The computer-readable storage medium of claim 1, wherein the application package is in an executable format.

7. The computer-readable storage medium of claim 1, the computer-implemented method further comprising downloading an additional resource associated with the application upon activation of a hyperlink on a Web page associated with the application.

8. The computer-readable storage medium of claim 7, wherein the additional resource comprises an on demand resource.

9. The computer-readable storage medium of claim 8, the computer-implemented method further comprising storing the on demand resource to the local data store.

10. The computer-readable storage medium of claim 7, wherein the additional resource comprises an online resource.

11. The computer-readable storage medium of claim 10, the computer-implemented method further comprising storing the online resource in a transient cache.

12. The computer-readable storage medium of claim 11, wherein transitioning the application to the installed full application comprises storing the online resource in the local data store.

13. The computer-readable storage medium of claim 1, wherein transitioning the application to the installed full application comprises downloading a plurality of remaining resources to the local data store, the plurality of remaining resources being components that are not currently in the local data store.

14. The computer-readable storage medium of claim 1, wherein transitioning the application to the installed full application comprises transferring a state associated with the application to the installed full application in a manner such that when the installed full application is launched offline, execution of the installed full application resumes at the state associated with the application.

15. The computer-readable storage medium of claim 14, wherein the state information is stored in an application object associated with the application.

16. A computer-executable method for transitioning a web application to a client-side full application, comprising:

identifying an application package associated with an application, the application package including sufficient resources to enable user interaction with the application;

downloading content of the application package to a local store, the content being less than the full application;

upon receiving a request for one of a plurality of additional resources associated with the application, downloading the additional resource, the request for one of a plurality of additional resources being made without corresponding user action; and upon receiving a request to transition the application to a client-side full application, downloading remaining resources to the local store, the request to transition the application to a client-side full application being made without corresponding user action.

17. The computer-executable method of claim 16, wherein the request to transition the application to the client-side full application is based on the number of additional resources currently stored in the local store.

18. The computer-executable method of claim 17, wherein the request to transition the application occurs autonomously.

19. The computer-executable method of claim 16, wherein the application package includes an application manifest and code, the application manifest uniquely identifying a subset of resources associated with the application.

20. The computer-executable method of claim 19, wherein the application comprises the subset of resources and the plurality of additional resources.

21. The computer-executable method of claim 20, wherein downloading the additional resource further comprises storing the additional resource in the local store if the additional resource comprises an on demand resource, and storing the additional resource in a transient cache if the additional resource comprises an online resource.

22. The computer-executable method of claim 16, further comprising determining whether the additional resource is available locally, and if so, using the local additional resource rather than downloading the additional resource.

23. The computer-executable method of claim 16, wherein the remaining resources are an additional subset out of the plurality of additional resources that are not currently stored in the local store.

24. The computer-executable method of claim 16, wherein transitioning the application to the client-side full application comprises transferring a state associated with the application to the client-side full application in a manner such that when the client-side full application is launched offline, execution of the client-side full application resumes at the state associated with the application when transitioned.

25. The computer-executable method of claim 16, wherein the state information is stored in an application object associated with the application.

* * * * *